United States Patent
Cha et al.

(10) Patent No.: US 6,522,191 B1
(45) Date of Patent: Feb. 18, 2003

(54) SYNCHRONIZED VOLTAGE GENERATOR FOR AMPLIFYING VOLTAGE INPUTS

(75) Inventors: In-Ho Cha, Seoul (KR); Byoung-Kwon Park, Seoul (KR)

(73) Assignee: Hynix Semiconductor, Inc., Kyoungki-Do (KR)

( * ) Notice: Subject to any disclaimer, the term of this patent is extended or adjusted under 35 U.S.C. 154(b) by 378 days.

(21) Appl. No.: 09/063,050

(22) Filed: Apr. 21, 1998

(30) Foreign Application Priority Data

Apr. 21, 1997 (KR) .......................................... 97/14714

(51) Int. Cl.⁷ ................................................. G05F 1/10
(52) U.S. Cl. ........................ 327/536; 327/148; 327/390; 363/59
(58) Field of Search ................................ 327/147, 148, 327/156, 157, 536, 589, 390; 363/59, 60; 331/1 A, 17, 25

(56) References Cited

U.S. PATENT DOCUMENTS

| 4,743,857 A | * | 5/1988 | Childers .................... 329/50 |
| 5,267,211 A | | 11/1993 | Kobayashi et al. .......... 365/288 |
| 5,365,121 A | * | 11/1994 | Morton et al. .............. 327/170 |
| 5,521,546 A | * | 5/1996 | Kim .......................... 327/536 |
| 5,701,096 A | * | 12/1997 | Higashiho ................... 327/536 |
| 5,703,540 A | * | 12/1997 | Gazda et al. ................ 331/16 |
| 5,740,213 A | * | 4/1998 | Dreyer ....................... 375/374 |
| 5,768,115 A | * | 6/1998 | Pascucci et al. ............. 363/59 |

* cited by examiner

Primary Examiner—Timothy P. Callahan
Assistant Examiner—An T. Luu
(74) Attorney, Agent, or Firm—Birch, Stewart, Kolasch & Birch, LLP

(57) ABSTRACT

A synchronized boosted voltage generator includes a pump controller for receiving an externally applied clock signal and an externally applied control signal, and outputting a charging control signal, a precharging control signal and a charge transfer control signal, a pumping capacitor for receiving the charging control signal and charging a node, a precharge circuit for receiving the precharging control signal and clamping a potential at the node so as not to fall below a predetermined voltage, a charge transfer transistor for transferring to a load the potential charged on the node and the pumping capacitor, respectively, and a charge transfer circuit for receiving the charge transfer control signal and outputting a pumping control signal for controlling the charge transfer transistor. The generator employs an internal clock signal generated by a ½ frequency divider from an externally applied clock signal, whereby a fixed duty cycle clock is to generate a stable boosted-voltage.

8 Claims, 5 Drawing Sheets

FIG. 4
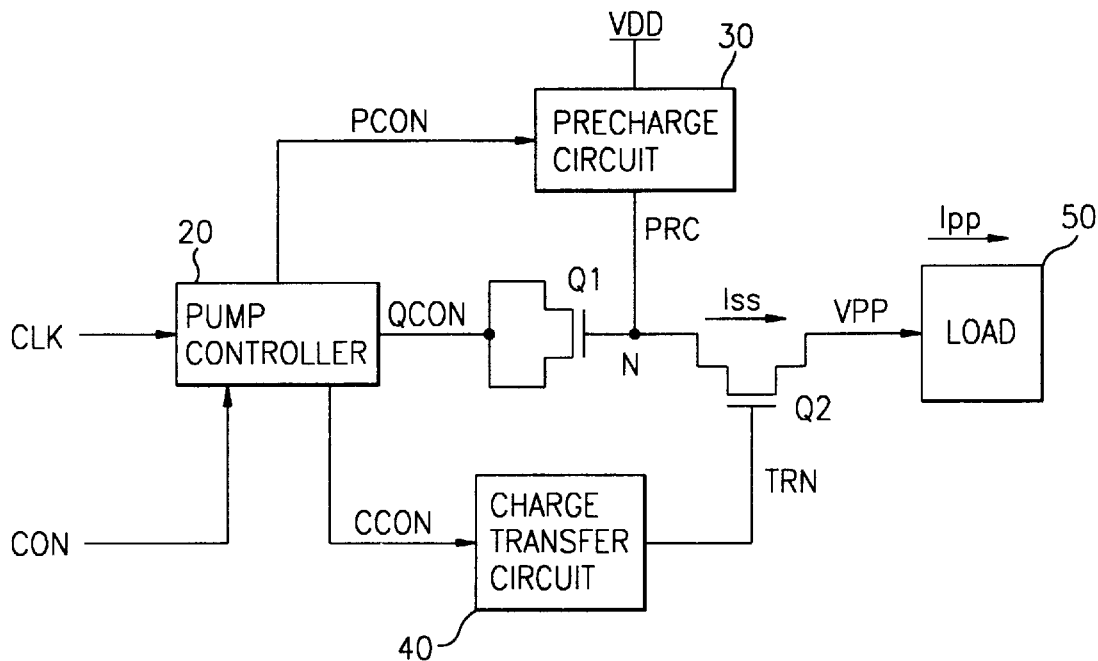
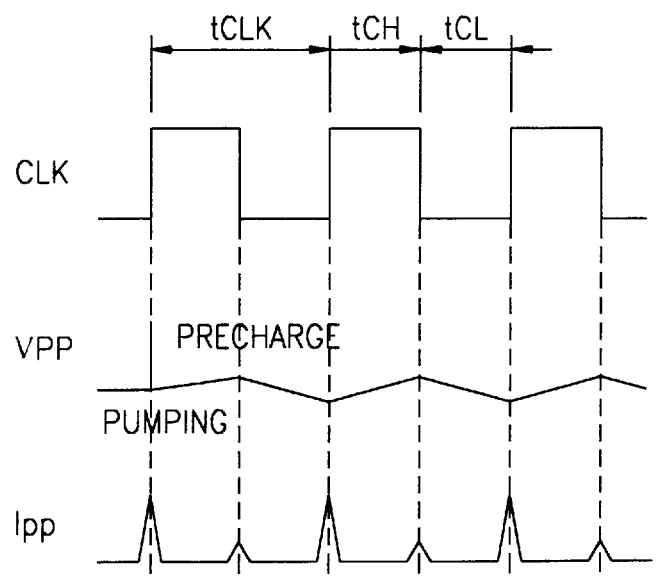
FIG.5A  CLK
FIG.5B  VPP
FIG.5C  Ipp

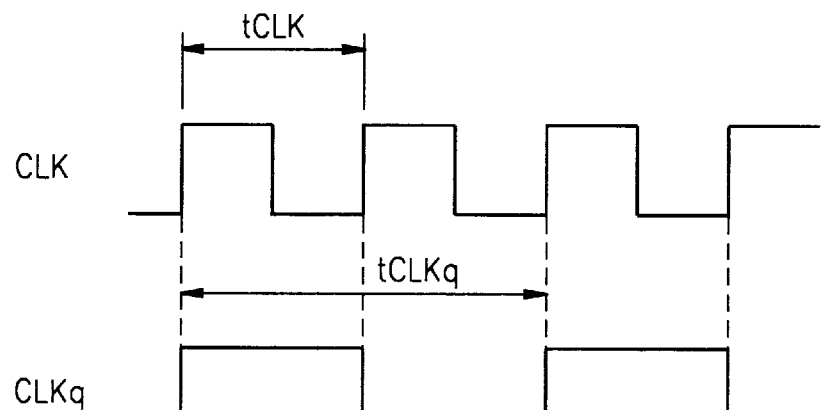
FIG.8A CLK
FIG.8B CLKq
FIG.8C VPPq
FIG.8D Ipp

US 6,522,191 B1

SYNCHRONIZED VOLTAGE GENERATOR FOR AMPLIFYING VOLTAGE INPUTS

BACKGROUND OF THE INVENTION

1. Field of the Invention

The present invention relates to a boosted voltage generator, and more particularly to an improved boosted-voltage synchronizing generator for decreasing power consumption in proportion to a bandwidth, and for outputting a stable and amplified voltage by employing an externally applied clock signal as a voltage pumping signal.

2. Description of the Prior Art

As shown in FIG. 1, conventional voltage generators include: an internal oscillator 10 outputting an internal oscillation signal OSC; a pump controller 20 receiving the internal oscillation signal OSC and an external control signal CON, and outputting a charging control signal QCON, a precharging control signal PCON and a charge transfer control signal CCON; a pumping capacitor C1 formed by a MOS transistor Q1 receiving the charging control signal QCON at a node connecting its source and drain and charging a node N connected to its case; a precharge circuit 30 receiving the precharging control signal PCON and an externally-supplied supply voltage Vdd and clamping the potential at the node N so that it does not fall below a predetermined voltage; an NMOS charge transfer transistor Q2 for regulating transfer of the voltage at node N to a load 50; and a charge transfer circuit 40 receiving the charge transfer control signal CCON and outputting a pumping control signal TRN for controlling the charge transfer transistor Q2.

The operation of the above-described boosted voltage generator according to the conventional art will now be described with reference to FIGS. 2A through 3.

First, the internal oscillator 10 generates the internal oscillation signal OSC having a predetermined cycle as shown in FIG. 2A. The frequency of the internal oscillation signal OSC is fixed in accordance with a delay and feedback circuit (not shown) consisting of an odd number of inverter chains (not shown) and transistors (not shown).

The pump controller 20 receives the internal oscillation signal OSC output from the internal oscillator 10 and the externally applied control signal CON, and generates the charging control signal QCON, the precharging control signal PCON and the charge transfer control signal CCON.

The charging control signal QCON, as shown in FIG. 2B, is applied to the pumping capacitor C1 to thereby charge the node N. The precharge circuit 30 receives the precharging control signal PCON and carries out a clamping operation so that the voltage at node N does not fall below the level of supply voltage Vdd. Therefore, the voltage PRC on the node N oscillates between the supply voltage Vdd and a boosted voltage Vpp, where the boosted voltage Vpp is defined by the sum of the supply voltage Vdd and the threshold voltage Vth of the MOS transistor Q2.

The charge transfer circuit 40 receives the charge transfer control signal CCON and generates the pumping control signal TRN which has a phase identical to that of the voltage PRC charged on the node N. The pumping control signal TRN is applied to the gate of the charge transfer transistor Q2, which outputs the high voltage level of the voltage at node N (e.g., the boosted voltage Vpp) by the pumping capacitor C1 to the load 50.

The boosted voltage generator according to the conventional art employs the internal oscillation signal OSC that is output from the internal oscillator 10 and that has a fixed frequency range. Therefore, the range of operation of the boosted voltage generator may be too narrowly limited by the fixed frequency range of the internal oscillator 10, rendering the boosted voltage generator unable to compensate for current Ipp consumed by the load 50 when outside the limited operating range of the boosted voltage generator. For instance, at frequencies above the limit of the boosted voltage generator, which limit is established based on the internal oscillation signal OSC, current consumed by load 50 is not compensated, rendering data unrecognizable.

By contrast, when the highest frequency of the boosted voltage generator is increased too significantly based on the frequency of the internal oscillation signal OSC, the power consumption tends to increase. For example, numerous problems are experienced when the load 50 represents a synchronous semiconductor memory device to be driven with boosted voltage Vpp output from the boosted voltage generator according to the conventional art.

First, the boosted voltage Vpp output from the boosted voltage generator according to the conventional art must drive both the gate of an NMOS pass transistor (not shown) of a memory cell, and the gate of a full-up NMOS transistor (not shown) of an output buffer. Because an appropriate level for the boosted voltage is different for each of these gates, it is difficult to optimize the level of the boosted voltage. For instance, an appropriate boosted voltage level for a memory cell is 'Vdd+2Vth' while an appropriate boosted voltage level for an output buffer is 'Vdd+Vth'.

Second, a data signal in the output buffer is synchronized and changed between high and low potential levels in accordance with a clock signal. When a data signal is changed to a high potential level, the boosted voltage Vpp output from the conventional boosted-voltage generator is applied to the gate of a full-up NMOS transistor (not shown) to perform a logic operation of a level shift circuit. As a result, a band width variation of a clock signal in a circuit related to the synchronously operating output buffer is so large that variation of a driving current Iss flowing through the boosted voltage generator becomes large relative to the band width. Because the conventional boosted-voltage generator operates based on a fixed frequency oscillation signal output from the internal oscillator 10, the internal oscillator 10 must have a wide band width to allow for synchronization over a wide range of band widths. However, as shown in FIG. 3, since the internal oscillator has a fixed frequency, its band width is necessarily limited. Therefore, the driving current Iss of the boosted voltage generator may exceed the current Ipp flowing the load 50, effectively causing increased power consumption.

SUMMARY OF THE INVENTION

It is an object of the present invention to improve upon the conventional generator described above.

It is also an object of the present invention to provide a synchronized boosted voltage generator capable of decreasing power consumption by making a bandwidth of a clock signal applied to the boosted voltage generator proportional to a bandwidth in terms of consumption current, and to provide a boosted voltage generator having a high bandwidth.

To achieve the above and other objects, there is provided a synchronized boosted voltage generator which includes a pump controller for receiving an externally applied clock signal and an externally applied control signal, and outputting a charging control signal, a precharging control signal and a charge transfer control signal, a pumping capacitor for receiving the charging control signal and charging a node, a precharge circuit for receiving the precharging control signal and clamping a potential on the node so as not to fall below a predetermined voltage, a charge transfer transistor for transferring to a load the potential charged on the node and the pumping capacitor, respectively, and a charge transfer circuit for receiving the charge transfer control signal, anal for outputting a pumping control signal for controlling the charge transfer transistor in accordance therewith.

BRIEF DESCRIPTION OF THE DRAWINGS

FIG. 4 is a block diagram of a boosted voltage synchronizing generator according to a charging embodiment of the present invention;

FIGS. 5A through 5C are timing diagrams of respective signals in the circuit of FIG. 4;

FIGS. 8A through 8D are timing diagrams of respective signals in the circuit of FIG. 7.

DETAILED DESCRIPTION OF THE INVENTION

With reference to the accompanying drawings, the boosted voltage synchronizing generator according to the present invention will now be described.

As shown in FIG. 4, the boosted voltage synchronizing generator according to a charging embodiment of the present invention includes: a pump controller 20 receiving an externally applied clock signal CLK and an externally applied control signal CON, and outputting a charging control signal QCON, a precharging control signal PCON and a charge transfer control signal CCON; a pumping capacitor C1 formed by an NMOS transistor Q1 receiving the charging control signal QCON and charging a node N; a precharge circuit 30 receiving the precharging control signal PCON and clamping the potential of node N at or above a predetermined voltage; an NMOS charge transfer transistor Q2 for transferring the voltage charged on the node N by the pumping capacitor transistor Q1 to a load 50; and a charge transfer circuit 40 for receiving the charge transfer control signal CCON and outputting a pumping control signal TRN for controlling the charge transfer transistor Q2.

Figure 1:
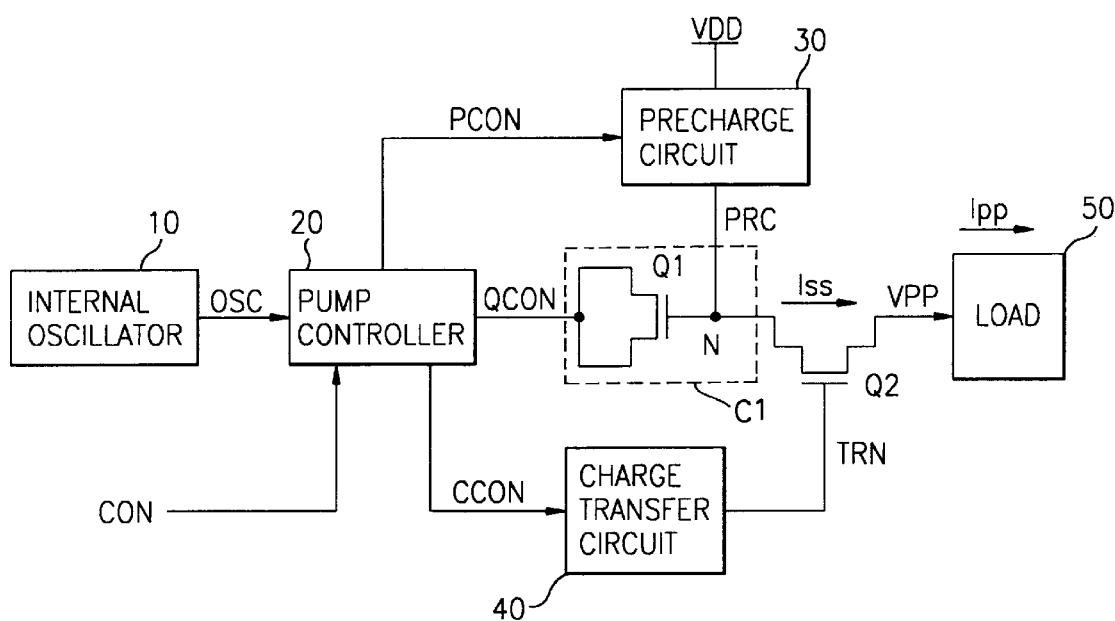
FIG. 1 is a block diagram of a boosted voltage generator according to the conventional art.
Figure 2A:
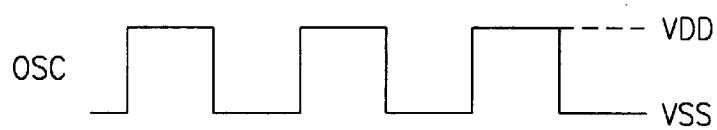
FIGS. 2A through 2E are timing diagrams of respective signals in the circuit of FIG. 1.
Figure 2B:
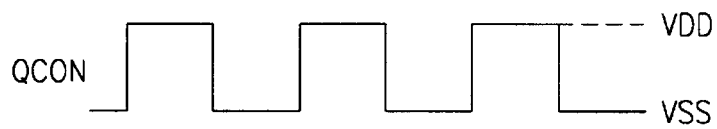
Figure 2C:
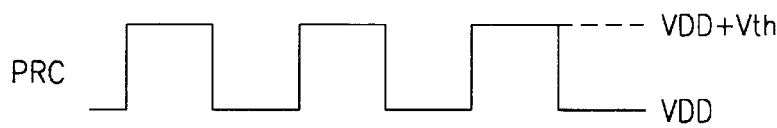
Figure 2D:
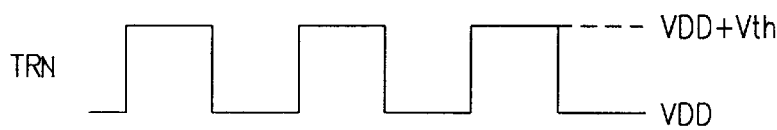
Figure 2E:
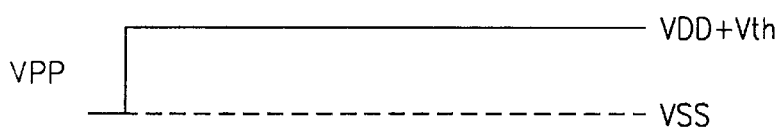
Figure 3:
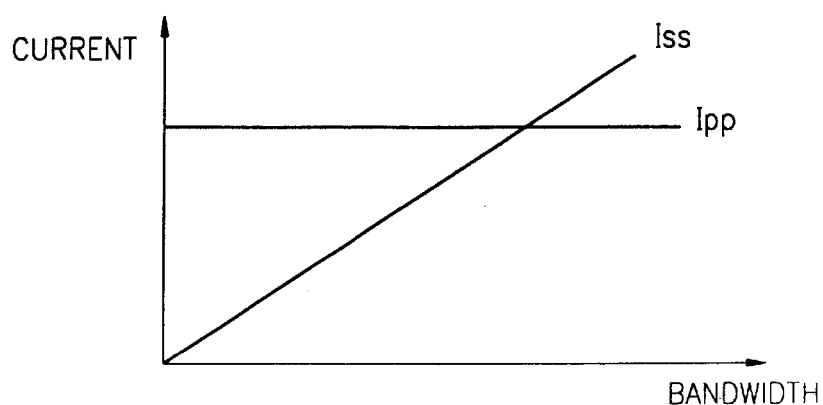
FIG. 3 is a graph illustrating the bandwidth of a boosted voltage pumping clock signal versus the driving current consumed in the circuit of FIG. 1.
Figure 6:
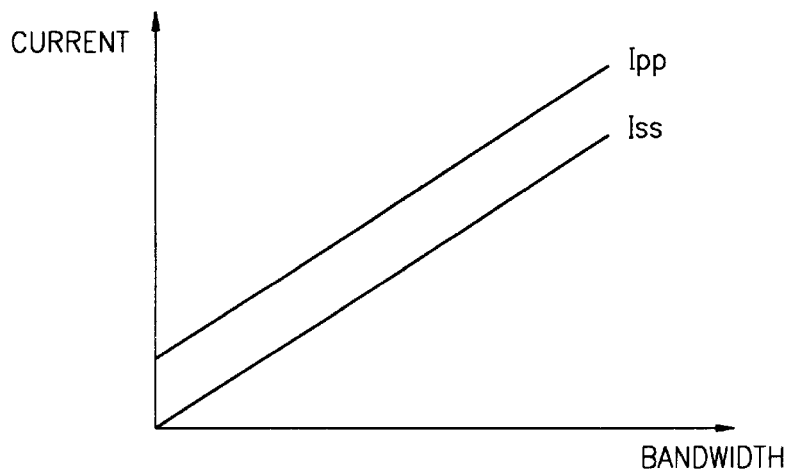
FIG. 6 is a graph illustrating the bandwidth of a boosted voltage pumping clock signal versus the driving current consumed in the circuit of FIG. 4.

The operation of the above-described boosted voltage generator according to the first embodiment of the invention will now be described with reference to FIGS. 5A through 6.

First, the pump controller 20 receives the externally applied clock signal CLK and the externally-applied control signal CON, and generates the charging control signal QCON, the precharging control signal PCON and the charge transfer control signal CCON.

The charging control signal QCON is applied to the transistor Q1 of the pumping capacitor to thereby charge the node N. The precharge circuit 30 receives the precharging control signal PCON and carries out a clamping operation so that the node N does not fall below the supply voltage Vdd. Therefore, the voltage on the node N oscillates between the supply voltage Vdd and boosted voltage Vpp. Here, the boosted voltage is the supply voltage Vdd increased by the a threshold voltage Vth of the NMOS transistor Q2.

The charge transfer circuit 40 receives the charge transfer control signal CCON and generates the pumping control signal TRN which has a phase identical to that of the voltage charged on the node N. The pumping control signal TRN is applied to the gate of the charge transfer transistor Q2, causing the boosted voltage Vpp stored in the node N by the pumping capacitor transistor Q1 to be transferred to the load 50. The transferred boosted voltage Vpp is oscillated in accordance with a pumping and a precharge operation as shown in FIG. 5B.

When the period tCLK of the clock signal CLK decreases, the driving current Iss from the boosted voltage generator becomes larger, and the current Ipp consumed becomes larger. To the contrary, when the period tCLK of the clock signal CLK increases, the driving current Iss from the boosted voltage generator becomes smaller, and the current Ipp consumed decreases. Therefore, as shown in FIG. 6, the consumption current Ipp becomes proportional to the driving current Iss with regard to each bandwidth thereof with a predetermined difference secured therebetween, thereby decreasing current consumption.

Figure 7:
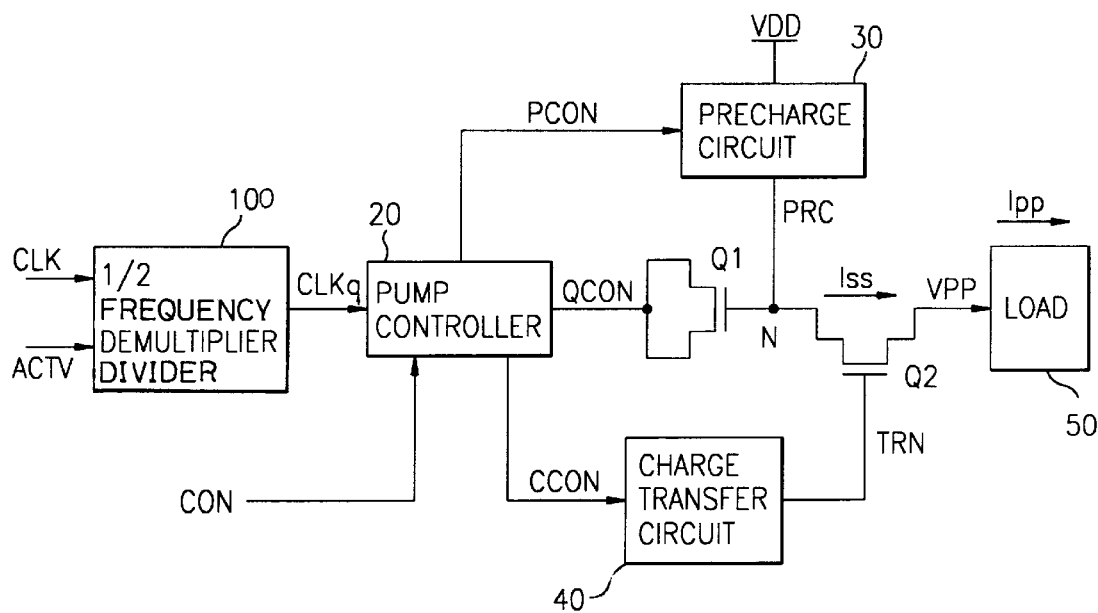
FIG. 7 is a block diagram of a boosted voltage synchronizing generator according to a precharging embodiment of the present invention.

Referring to FIG. 7, the boosted voltage synchronizing generator according to the precharging embodiment of the present invention includes a ½ frequency divider 100 which outputs a clock signal CLKq having a frequency one-half the frequency of the clock signal CLK in the charging embodiment of the present invention as shown in FIG. 4, wherein the ½ frequency divider 100 provides input to the pump controller 20.

With reference to FIGS. 8A through 8D, the operation of the boosted voltage synchronizing generator according to the precharging embodiment of the present invention will now be described.

First, an externally applied clock signal CLK and an enablee signal ACTV are inputted to the ½ frequency divider 100, which generates the internal clock signal CLKq.

Pump controller 20 receives the internal clock signal CLKq generated from the ½ frequency divider 100 and the externally applied control signal CON, and generates the charging control signal QCON, the precharging control signal PCON and the charge transfer control signal CCON.

The subsequent operation is identical to that of the charging embodiment of the present invention and the description thereof will be omitted accordingly.

As shown in FIG. 7, the boosted voltage synchronizing generator according to the precharging embodiment of the present invention does not employ the external clock signal CLK of a synchronous semiconductor as a boosted voltage pumping clock signal. Rather, the generator shown in FIG. 7 employs a clock signal CLKq generated through the ½ frequency divider 100. The duty cycle of the external clock signal CLK is represented by the ratio of high potential time tCH versus the period tCLK of the external clock signal CLK, as shown in FIG. 5A. Although this duty cycle is varied, the arrangement of FIG. 7 ensures that the internal clock signal CLKq is changed to a low potential only when the external clock signal CLK is changed to a high potential, thereby making it possible to obtain a stable duty cycle capable of generating a stable boosted-voltage Vpp.

As described above, the boosted voltage synchronizing generator according to the present invention utilizes a synchronized external clock signal CLK of a semiconductor, and consumes the driving current Ipp proportional to the bandwidth thereof, thereby enabling current decrease. That is, although the period tCLK of the external clock signal is too short, the driving current Iss from the boosted voltage generator serves to compensate for the current Ipp consumed by the load 50, so that power consumption is decreased. Also, when the load 50 is operational under a high bandwidth, a high potential data logic is normally recognized.

In addition, when the internal clock signal CLKq generated from the ½ frequency divider 103 is employed as a boosted voltage pumping clock signal CLK in place of using the external clock signal CLK of a synchronous semiconductor, a duty cycle clock having a fixed relation to the external clock signal CLK is obtained, serving to generate the stable boosted-voltage Vpp.

Further, because the ½ frequency divider is controlled in accordance with a synchronous enable signal ACTV, the internal clock signal CLKq latches a previous state thereof when a clock signal is temporarily suspended, thereby decreasing power consumption.

Also, when the load 50 is a synchronous semiconductor apparatus, the boosted voltage generator according to the present invention may be applied to a circuit related to an output buffer, so that a level of the boosted voltage may be easily optimized. The consumption current Ipp flowing through the load 50 is increased in proportion to a bandwidth thereof, so that the operation may be carried out without unnecessarily increasing power consumption, even in a high bandwidth region.

What is claimed is:

1. A synchronized boosted voltage generator, comprising:
    a first means for receiving an externally applied clock signal and an externally applied control signal, and outputting first, second and third signals;
    a charging means for receiving the first signal and charging a node;
    a second means for receiving the second signal and clamping a potential on the node so as not to fall below a predetermined voltage;
    a third means for receiving the third signal and outputting a fourth signal which is to control a pumping operation;
    a fourth means for receiving the fourth signal and transferring to a load the potential charged on the node and on the charging means; and
    a divider for outputting an internal clock signal derived from the externally applied clock signal to the first means.

2. The generator of claim 1, wherein an enable signal is applied to the divider.

3. A synchronized boosted voltage generator, comprising:
    a first means for receiving an externally applied clock signal and an externally applied control signal, and outputting first, second and third signals;
    a charging means for receiving the first signal and charging a node;
    a second means for receiving the second signal and clamping a potential on the node so as not to fall below predetermined voltage;
    a third means for receiving the third signal and outputting a fourth signal which is to control a pumping operation;
    a fourth means for receiving the fourth signal and transferring to a load the potential charged on the node and on the charging means; and
    a ½ frequency divider which converts the externally applied clock signal to a synchronized internal clock signal and outputs the synchronized internal clock signal to the pumping controller.

4. The generator of claim 3, wherein an enable signal is applied to the ½ frequency divider.

5. A synchronized boosted voltage generator, comprising:
    a first means for receiving an externally applied clock signal and an externally applied control signal, and outputting first, second and third signals;
    a charging means for receiving the first signal and charging a node;
    a second means for receiving the second signal and clamping a potential on the node so as not to fall below a predetermined voltage;
    a third means for receiving the third signal and outputting a fourth signal which is to control a pumping operation; and
    a fourth means for receiving the fourth signal and transferring to a load the potential charged on the node and on the charging means;
    wherein the externally applied clock signal is received from a clock signal generator that communicates with the voltage generator.

6. A synchronized boosted voltage generator, comprising:
    a pump controller for receiving an externally applied clock signal and an externally applied control signal, and outputting a charging control signal, a precharging control signal and a charge transfer control signal;
    a pumping capacitor for receiving the precharging control signal and clamping a potential on the node so as not to fall below a predetermined voltage;
    a charge transfer transistor for transferring to a load the potential charged on the node and the pumping capacitor, respectively; and
    a charge transfer circuit for receiving the charge transfer control signal, and outputting a pumping control signal for controlling the charge transfer transistor in accordance therewith,
    wherein the externally applied clock signal is received from a clock signal generator that communicates with the voltage generator.

7. A synchronized boosted voltage generator, comprising:
    a first means for receiving an externally applied clock signal and an externally applied control signal, and outputting first, second and third signals;
    a charging means for receiving the first signal and charging a node;
    a second means for receiving the second signal and clamping a potential on the node so as not to fall below a predetermined voltage;
    a third means for receiving the third signal and outputting a fourth signal which is to control a pumping operation; and
    a fourth means for receiving the fourth signal and transferring to a load the potential charged on the node and on the charging means,
    wherein the externally applied clock signal has a variable dynamic range.

8. A synchronized boosted voltage generator, comprising:
    a pump controller for receiving an externally applied clock signal and an externally applied control signal, and outputting a charging control signal, a precharging control signal and a charge transfer control signal;

a pumping capacitor for receiving the precharging control signal and clamping a potential on the node so as not to fall below a predetermined voltage;

a charge transfer transistor for transferring to a load the potential charged on the node and the pumping capacitor, respectively; and a charge transfer circuit for receiving the charge transfer control signal, and outputting a pumping control signal for controlling the charge transfer transistor in accordance therewith, wherein the externally applied clock signal has a variable dynamic range.

* * * * *